UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

ARTIFICIAL RESIN FROM GLYCEROL AND THE LIKE

No Drawing.  Application filed December 26, 1922. Serial No. 609,136.

This invention relates to resinous substances and molding compositions prepared from glycerol, polyglycerol, glycol and similar polyhydric alcohols and monobasic or polybasic carboxylic acids or their anhydrides such as phthalic acid and anhydride, citric, malic, tartaric, maleic, fumaric, oleic, stearic acids and also certain resin acids.

In the present invention there is involved in one phase a reaction due to heat which causes sudden solidification. When the glycerol is not used in excess but for example when the acid and the alcohol employed are present in combining proportions and more especially when the acid is of the polybasic type, an almost instantaneous solidification may occur on reaching a certain temperature. Thus 3 mols. of phthalic anhydride to 2 mols. of glycerol when heated to 235–240° C. suddenly become transformed from a liquid to a spongy solid which is insoluble in ordinary solvents. When this mass is heated further it carbonizes at about 285° C. The addition of 25 per cent of rosin raises the solidification point to 248° C.

Tartaric acid used similarly in molecular proportions yields a solid insoluble mass at 199–200° C. Malic acid and glycerol in like proportions yield a solid mass at 209–210° C.
Maleic and fumaric acids likewise harden but at higher temperatures.

On the other hand for example increasing the proportion of glycerol changes the character of the reaction. In one case with a larger proportion of glyceral frothing occurred at 240° C. but no solidification. The mixture was maintained at about 240° C. to allow frothing to subside and then was further heated. At 290° C. an insoluble resin was obtained.

Polyglycerol reacts in a manner similar to glycerol. 1 part of polyglycerol and 2 parts of phthalic anhydride solidify at 235° C.

The solidification referred to is not a gradual hardening in most cases but is a rather sudden conversion from a molten liquid to a spongy solid. The reaction is accompanied by the evolution of some gases or vapors and the resin therefore increases in bulk considerably during solidification.

Different results are obtained when using oleic acid in the proportion of 20 parts oleic acid in the proportion of 20 parts phthalic anhydride, 10 parts oleic acid and 7½ parts glycerol, the proportions being by weight. In this case a small amount of zinc oxide was added. At 150–170° C. the melt becomes homogeneous but solidification does not occur even on heating up to 260° C. A product heated to this temperature is a soft gummy opaque brown mass. Mixed with an equal part of nitrocellulose in an appropriate solvent mixture the oleic compound was found to blend readily giving a transparent flexible film which was not attacked by water. Any suitable well known solvents for nitrocellulose serve to incorporate the oleic resin therewith.

Stearic acid heated with phthalic anhydride and glycerol give a hard light colored resin which may be incorporated with nitrocellulose. Boric acid heated with tartaric acid and glycerol in the proportion of 31 parts boric acid, 75 parts tartaric acid and 46 parts glycerol at 140° gives a transparent amber colored mass soluble in hot water. At 160° C. an opaque brittle product also soluble in hot water is obtained. Phthalic acid and boric acid and glycerol also yield solid glassy products.

When phthalic anhydride in the proportion of 4 parts is incorporated with 1 part glycerol and the mixture heated solidification occurs at 242° C. with sublimation of the excess of phthalic anhydride.

A number of substances lower the temperature at which solidification occurs. For example when heating a mixture of glycerol and organic acid with vigorous stirring the addition of basic substances such as zinc oxide, calcium oxide, barium carbonate, barium hydroxide and the like somewhat lowers the temperature of solidification but this may be probably due to formation of the corresponding salts with phthalic acids.

When 2.7 parts of phthalic anhydride and 1 part of glycerol are heated with stirring forming a mixture which normally would solidify at 235–240° C., a marked difference is noted when ammonium persulphate is added as a catalyst; the batch at 140–145° C. becoming so viscous that stirring could not be continued. Under these conditions bleaching powder at 160° C. gave a very viscous mass, solidification occurred at 160–165° C. When using ammonium bisulphate and with zinc chloride a rubbery compound was obtained at 155° C. Rubbery masses also were obtained with uranium nitrate.

Silico tungstic acid in the proportion of 10 per cent exerted a very vigorous action at 115–125° C. At this temperature the mixture became to viscous to stir and charring occurred the temperature rising spontaneously to 160° C. With 4 per cent of silico tungstic acid solidification occurred at 155° C. When resin from phthalic anhydride and glycerol (prepared in molecular proportions) but heated only to 232° C. to avoid transformation to the insoluble heat resistant form, received an admixture of silica tungstic acid the composition was found to harden very quickly on the hot plate.

In making molding compositions from fusible resin from phthalic anhydride and glycerol which had been heated only to 232° C. and thus had not been transformed to the insoluble heat resistant product said resin is dissolved in hot benzol or a mixture of alcohol and benzol and a suitable filler such as wood flour impregnated with the solution and dried. Other fillers such as asbestos and various mineral powders, fibres of various descriptions, paper etc. including any of the known filling and extending material may be incorporated in this way by treatment with solvent or in any other suitable manner. Various catalysts may be added if desired and the composition hot pressed to give a shaped or fashioned article.

It may be noted that the resin which has been heated to about 235° C. to convert it into a spongy solid is not absolutely infusible at least the powdered material when strongly hot pressed welds together to give a transparent glass-like product.

Mixtures of the foregoing resins such as the phthalic glycerol resin mentioned incorporated with suitable fillers likewise may be converted into fashioned articles by the cold molding process.

Among other acids which may be used may be mentioned lactic and mucic acids. The latter however gives a very dark colored product. This darkening begins at about the melting point of mucic acid, 206° C. Resins made from equal parts of mucic acid, phthalic acid and glycerol are harder but not improved in color.

What I claim is:—

1. In the production of ester resins from a carboxylic acid and a polyhydric alcohol, the step of adding an alkaline material during the formation of the resin, whereby a lowering of the solidification temperature is effected.

2. In the manufacture of ester resins, by heat-treatment of a mixture containing a phthalic acid material and a liquid polyhydric alcohol, the herein described step of adding a polyvalent-metal-containing compound capable of combining with free acids in the resin during the formation of the resin.

3. In the manufacture of ester resins, by heat-treatment of a mixture containing a phthalic acid material and a liquid polyhydric alcohol, the herein described step of adding a basic compound of an alkaline earth metal capable of combining with free acids in the resin during the formation of the resin.

4. In the manufacture of ester resins, by heat-treatment of a mixture containing a phthalic acid material and a liquid polyhydric alcohol, the herein described step of adding lime capable of combining with free acids in the resin during the formation of the resin.

5. A composition of matter comprising a fusible polyhydric aliphatic alcohol-organic acid condensation product and finely divided solid material capable of accelerating the conversion thereof by heat to the infusible state.

6. A composition of matter comprising a polyhydric alcohol-organic acid initial condensation product and a finely divided solid material capable of accelerating the conversion thereof by heat to the infusible state.

7. A composition of matter comprising a polyhydric alcohol-organic acid initial condensation product and a material capable of accelerating the conversion thereof by heat to the infusible state.

8. A composition of matter comprising a fusible soluble polyhydric alcohol-organic acid condensation product and a material capable of accelerating the conversion thereof by heat into a product of decreased solubility.

9. A composition of matter comprising a fusible soluble polyhydric alcohol-polybasic organic acid-monobasic acid condensation product and a material capable of accelerating the conversion thereof by heat into a product of decreased solubility.

10. A product containing an infusible polyhydric alcohol-organic acid condensation product and a residuum of a material capable of accelerating the conversion by heat of a polyhydric alcohol-organic acid initial condensation product to the infusible state.

11. The process of preparing resinous compositions which comprises forming a polyhydric alcohol-organic acid initial condensation product, incorporating material therewith capable of accelerating the conversion of said initial condensation product by heat to the infusible state, and heating to produce conversion to the infusible state.

12. The process of preparing resinous compositions which comprises preparing a soluble polybasic organic acid-polyhydric alcohol condensation product, containing a material capable of accelerating the conversion thereof by heat into a product of decreased solubility, and heating the composition to produce a resinous product of decreased solubility.

CARLETON ELLIS.